US012701448B2

(12) United States Patent
Wang et al.

(10) Patent No.: US 12,701,448 B2
(45) Date of Patent: Aug. 4, 2026

(54) MEASUREMENT REPORTING USING A LOOKUP TABLE

(71) Applicant: QUALCOMM Incorporated, San Diego, CA (US)

(72) Inventors: Hua Wang, Basking Ridge, NJ (US); Tao Luo, San Diego, CA (US); Taesang Yoo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 18/185,940

(22) Filed: Mar. 17, 2023

(65) Prior Publication Data

US 2024/0314606 A1     Sep. 19, 2024

(51) Int. Cl.
| | |
|---|---|
| *H04W 24/10* | (2009.01) |
| *H04B 17/318* | (2015.01) |
| *H04B 17/336* | (2015.01) |

(52) U.S. Cl.
CPC .......... *H04W 24/10* (2013.01); *H04B 17/328* (2023.05); *H04B 17/336* (2015.01)

(58) Field of Classification Search
CPC .... H04W 24/10; H04B 17/328; H04B 17/336
See application file for complete search history.

(56) References Cited

U.S. PATENT DOCUMENTS

| | | |
|---|---|---|
| 2012/0057557 A1 | 3/2012 | Prasad et al. |
| 2013/0142271 A1 | 6/2013 | Nilsson et al. |

| | | | |
|---|---|---|---|
| 2014/0055302 A1* | 2/2014 | Jia ........................ | H04L 1/0027 |
| | | | 342/372 |
| 2018/0227102 A1* | 8/2018 | John Wilson ........... | H04L 5/001 |
| 2018/0317111 A1* | 11/2018 | Agnihotri ............. | G01S 5/0252 |
| 2020/0288479 A1* | 9/2020 | Xi ....................... | H04W 72/046 |
| 2021/0068123 A1* | 3/2021 | Zhu ..................... | H04W 72/046 |
| 2021/0160706 A1* | 5/2021 | Wu ....................... | H04B 7/088 |
| 2021/0167875 A1* | 6/2021 | Shen ................... | H04B 7/0695 |
| 2022/0149903 A1* | 5/2022 | Lee ...................... | H04B 7/0417 |
| 2022/0407745 A1 | 12/2022 | Lo et al. | |
| 2023/0254025 A1* | 8/2023 | Kumar .................. | H04W 24/10 |
| | | | 370/252 |
| 2025/0167953 A1* | 5/2025 | Guan .................. | H04B 7/06952 |
| 2025/0317776 A1* | 10/2025 | Cao ....................... | H04L 5/0057 |

OTHER PUBLICATIONS

International Search Report and Written Opinion—PCT/US2024/016117—ISA/EPO—Sep. 4, 2024.
Partial International Search Report—PCT/US2024/016117—ISA/EPO—Jun. 24, 2024.

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a reference signal associated with a beam management. The UE may perform a layer 1 (L1) reference signal received power (RSRP) or an L1 signal-to-interference-plus-noise ratio (SINR) (RSRP/SINR) measurement based at least in part on the reference signal. The UE may determine, based at least in part on a search of a lookup table (LUT), an entry in the LUT that corresponds to the L1 RSRP/SINR measurement. The UE may transmit, to the network node, an L1 RSRP/SINR measurement report that indicates the entry in the LUT. Numerous other aspects are described.

30 Claims, 9 Drawing Sheets

500

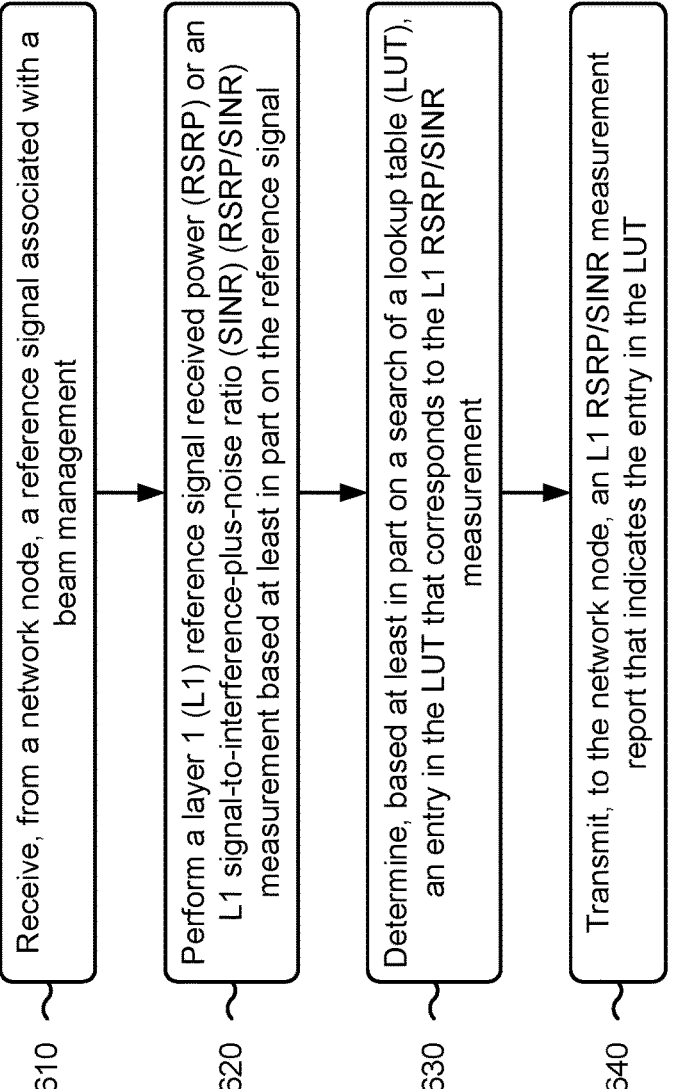

Receive, from a network node, a reference signal associated with a beam management

610

Perform a layer 1 (L1) reference signal received power (RSRP) or an L1 signal-to-interference-plus-noise ratio (SINR) (RSRP/SINR) measurement based at least in part on the reference signal

620

Determine, based at least in part on a search of a lookup table (LUT), an entry in the LUT that corresponds to the L1 RSRP/SINR measurement

630

Transmit, to the network node, an L1 RSRP/SINR measurement report that indicates the entry in the LUT

710    Transmit, to a user equipment (UE), a reference signal associated with a beam management 720    Receive, from the UE, an L1 RSRP/SINR measurement report based at least in part on the reference signal, wherein the L1 RSRP/SINR measurement report indicates an entry in a LUT that corresponds to an L1 RSRP/SINR measurement

MEASUREMENT REPORTING USING A LOOKUP TABLE

FIELD OF THE DISCLOSURE

Aspects of the present disclosure generally relate to wireless communication and to techniques and apparatuses for measurement reporting using a lookup table (LUT).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, a reference signal associated with a beam management; perform a layer 1 (L1) reference signal received power (RSRP) or an L1 signal-to-interference-plus-noise ratio (SINR) (RSRP/SINR) measurement based at least in part on the reference signal; determine, based at least in part on a search of a lookup table (LUT), an entry in the LUT that corresponds to the L1 RSRP/SINR measurement; and transmit, to the network node, an L1 RSRP/SINR measurement report that indicates the entry in the LUT.

In some implementations, an apparatus for wireless communication at a network node includes a memory and one or more processors, coupled to the memory, configured to: transmit, to a UE, a reference signal associated with a beam management; and receive, from the UE, an L1 RSRP/SINR measurement report based at least in part on the reference signal, wherein the L1 RSRP/SINR measurement report indicates an entry in a LUT that corresponds to an L1 RSRP/SINR measurement.

In some implementations, a method of wireless communication performed by a UE includes receiving, from a network node, a reference signal associated with a beam management; performing an L1 RSRP/SINR measurement based at least in part on the reference signal; determining, based at least in part on a search of a LUT, an entry in the LUT that corresponds to the L1 RSRP/SINR measurement; and transmitting, to the network node, an L1 RSRP/SINR measurement report that indicates the entry in the LUT.

In some implementations, a method of wireless communication performed by a network node includes transmitting, to a UE, a reference signal associated with a beam management; and receiving, from the UE, an L1 RSRP/SINR measurement report based at least in part on the reference signal, wherein the L1 RSRP/SINR measurement report indicates an entry in a LUT that corresponds to an L1 RSRP/SINR measurement.

In some implementations, a non-transitory computer-readable medium storing a set of instructions for wireless communication includes one or more instructions that, when executed by one or more processors of a UE, cause the UE to: receive, from a network node, a reference signal associated with a beam management; perform an L1 RSRP/SINR measurement based at least in part on the reference signal; determine, based at least in part on a search of a LUT, an entry in the LUT that corresponds to the L1 RSRP/SINR measurement; and transmit, to the network node, an L1 RSRP/SINR measurement report that indicates the entry in the LUT.

In some implementations, a non-transitory computer-readable medium storing a set of instructions for wireless communication includes one or more instructions that, when executed by one or more processors of a network node, cause the network node to: transmit, to a UE, a reference signal associated with a beam management; and receive, from the UE, an L1 RSRP/SINR measurement report based at least in part on the reference signal, wherein the L1 RSRP/SINR measurement report indicates an entry in a LUT that corresponds to an L1 RSRP/SINR measurement.

In some implementations, an apparatus for wireless communication includes means for receiving, from a network node, a reference signal associated with a beam management; means for performing an L1 RSRP/SINR measurement based at least in part on the reference signal; means for determining, based at least in part on a search of a LUT, an entry in the LUT that corresponds to the L1 RSRP/SINR measurement; and means for transmitting, to the network node, an L1 RSRP/SINR measurement report that indicates the entry in the LUT.

In some implementations, an apparatus for wireless communication includes means for transmitting, to a UE, a reference signal associated with a beam management; and means for receiving, from the UE, an L1 RSRP/SINR measurement report based at least in part on the reference signal, wherein the L1 RSRP/SINR measurement report indicates an entry in a LUT that corresponds to an L1 RSRP/SINR measurement.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with measurement reporting using a LUT, in accordance with the present disclosure.

DETAILED DESCRIPTION

Figure 1:
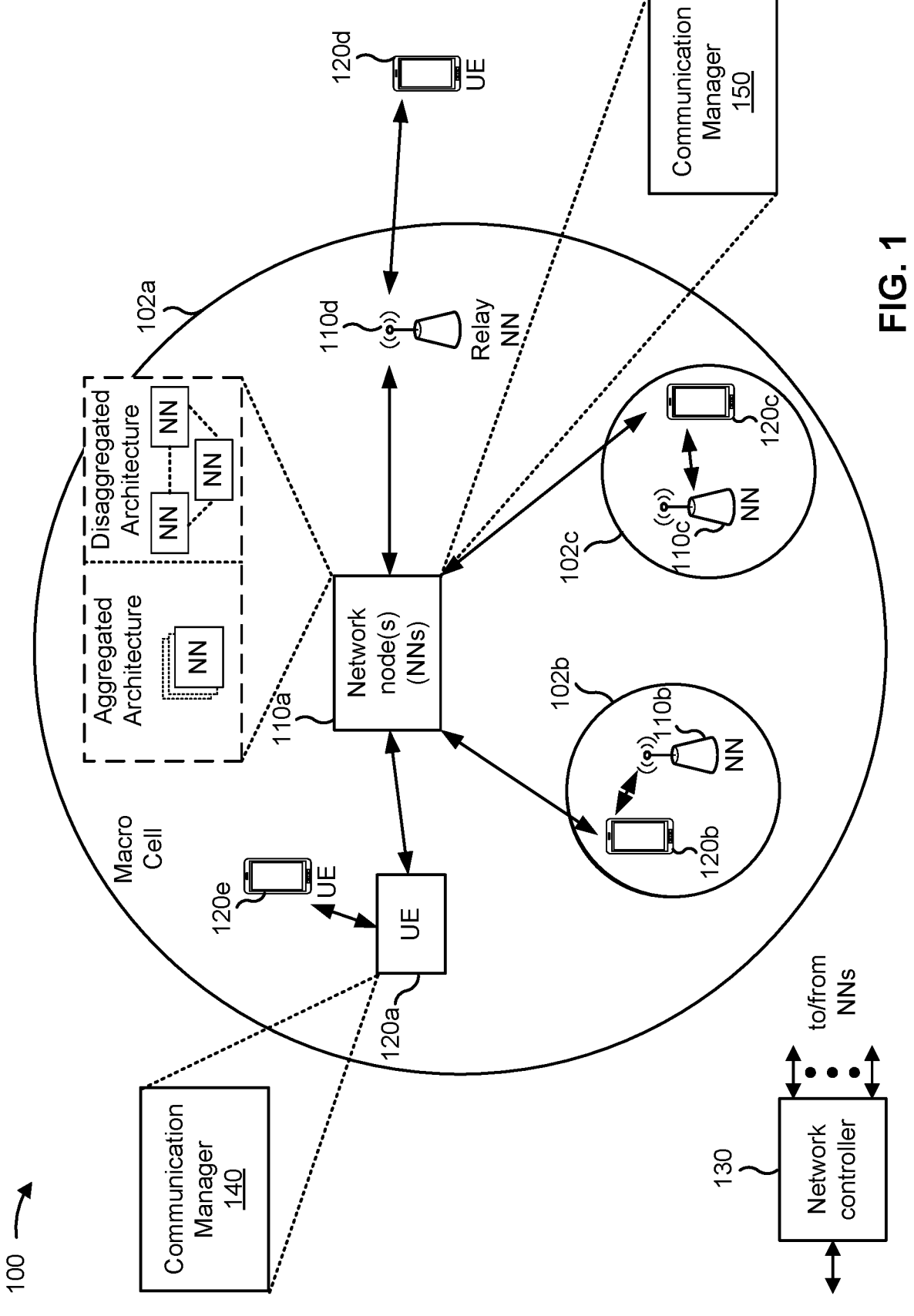
FIG. 1 is a diagram illustrating an example of a wireless network, in accordance with the present disclosure.

A layer 1 (L1) reference signal received power (RSRP) or an L1 signal-to-interference-plus-noise ratio (SINR) (RSRP/SINR) measurement report may indicate a certain quantity of RSRP/SINR values using a certain quantity of bits. For example, four RSRP/SINR values may be reported in an L1 RSRP/SINR measurement report, using 40 to 50 bits. However, for some applications, additional RSRP/SINR values May need to be reported. For example, when monitoring synchronization signal blocks (SSBs) of multiple cells, a UE may need to report 40 or more bits for each cell, which may be a considerable payload. Further, for some applications, differential RSRP/SINR values for four beams may not be sufficient. For example, for beam prediction using artificial intelligence (AI) or machine learning (ML), 8 or 16 beams may be needed in order to predict an RSRP/SINR value of a narrow channel state information reference signal (CSI-RS) beam from measured RSRP/SINR values of SSB beams. Thus, for some applications, a quantity of bits may need to be reduced or compressed for reporting L1 RSRP/SINR values to the network node.

In some aspects described herein, a UE may receive, from a network node, a reference signal associated with a beam management. The UE may perform an L1 RSRP/SINR measurement based at least in part on the reference signal. The UE may determine, based at least in part on a search of a lookup table (LUT), an entry in the LUT that corresponds to the L1 RSRP/SINR measurement. In other words, the UE may search the LUT, which may be locally stored at the UE, for an entry that matches the L1 RSRP/SINR measurement. The entry in the LUT may correspond to a beam index associated with the L1 RSRP/SINR measurement and/or an RSRP/SINR value associated with the L1 RSRP/SINR measurement. The UE may transmit, to the network node, an L1 RSRP/SINR measurement report that indicates the entry in the LUT. In some aspects, the UE may use the LUT to reduce the quantity of bits needed for the L1 RSRP/SINR measurement report. The L1 RSRP/SINR measurement report may use fewer bits, which may be useful for certain applications that require additional RSRP/SINR values (e.g., AI/ML-based beam prediction). The reduced signaling overhead that results from the L1 RSRP/SINR measurement report may improve a performance of the UE and/or the network node, and may reduce a network congestion.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an CNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive, from a network node, a reference signal associated with a beam management; perform an L1 RSRP/SINR measurement based at least in part on the reference signal; determine, based at least in part on a search of a LUT, an entry in the LUT that corresponds to the L1 RSRP/SINR measurement; and transmit, to the network node, an L1 RSRP/SINR measurement report that indicates the entry in the LUT. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit, to a UE, a reference signal associated with a beam management; and receive, from the UE, an L1 RSRP/SINR measurement report based at least in part on the reference signal, wherein the L1 RSRP/SINR measurement report indicates an entry in a LUT that corresponds to an L1 RSRP/SINR measurement. Additionally, or alternatively, the communication manager 150 may perform one or more other operations described herein.

As indicated above, FIG. 1 is provided as an example. Other examples may differ from what is described with regard to FIG. 1.

Figure 2:
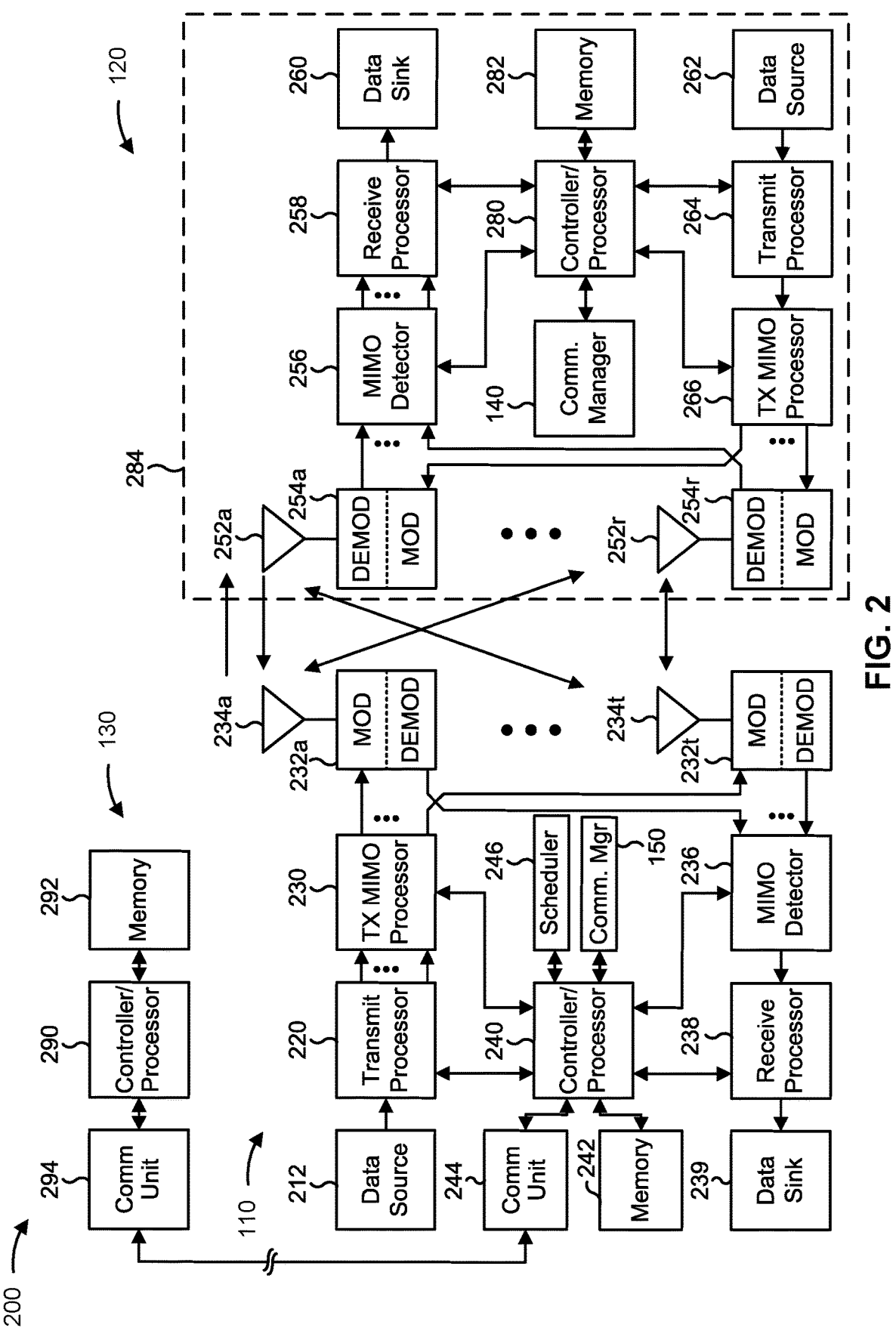
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with measurement reporting using a LUT, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, a reference signal associated with a beam management; means for performing an L1 RSRP/SINR measurement based at least in part on the reference signal; means for determining, based at least in part on a search of a LUT, an entry in the LUT that corresponds to the L1 RSRP/SINR measurement; and/or means for transmitting, to the network node, an L1 RSRP/SINR measurement report that indicates the entry in the LUT. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, a reference signal associated with a beam management; and/or means for receiving, from the UE, an L1 RSRP/SINR measurement report based at least in part on the reference signal, wherein the L1 RSRP/SINR measurement report indicates an entry in a LUT that corresponds to an L1 RSRP/SINR measurement. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
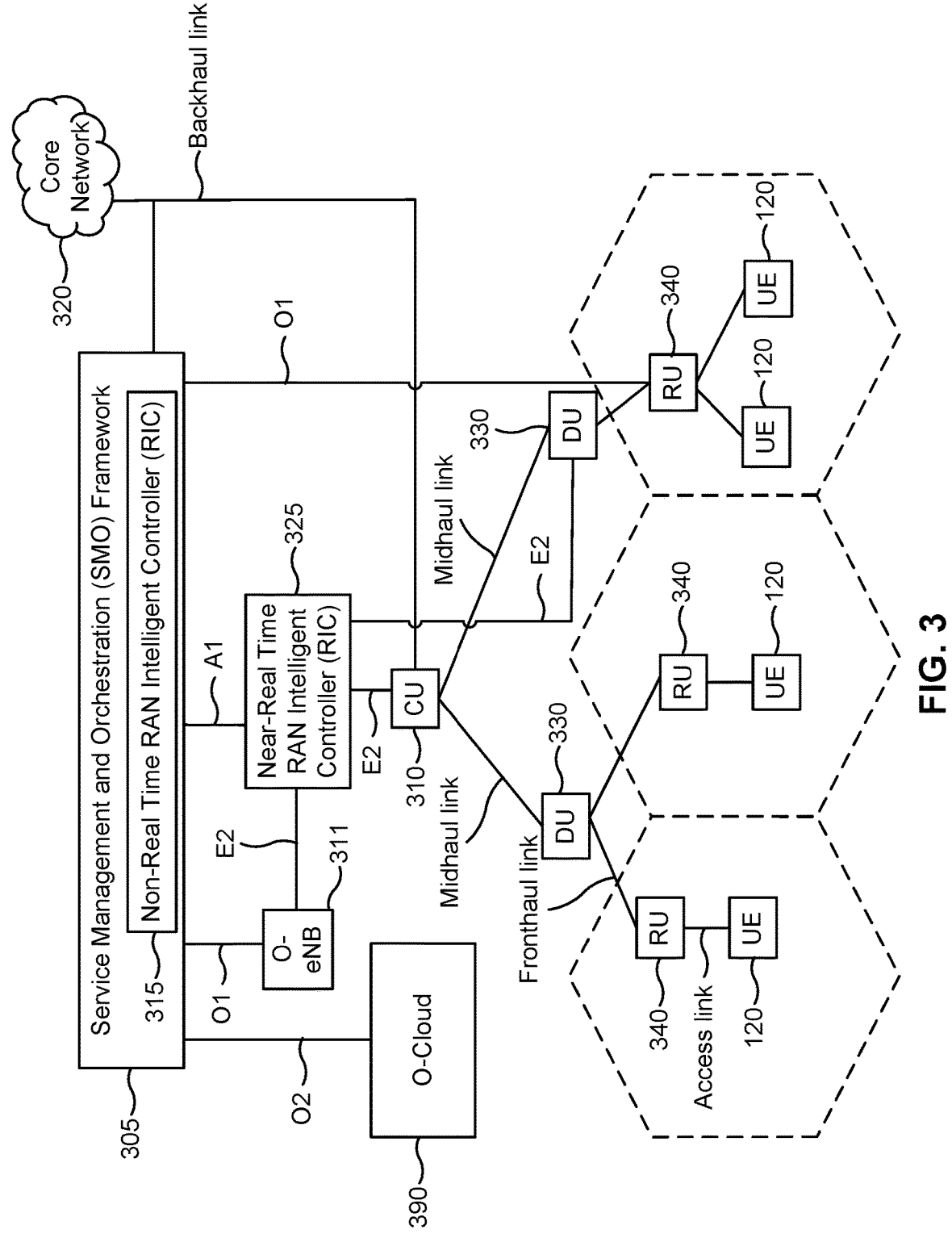
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
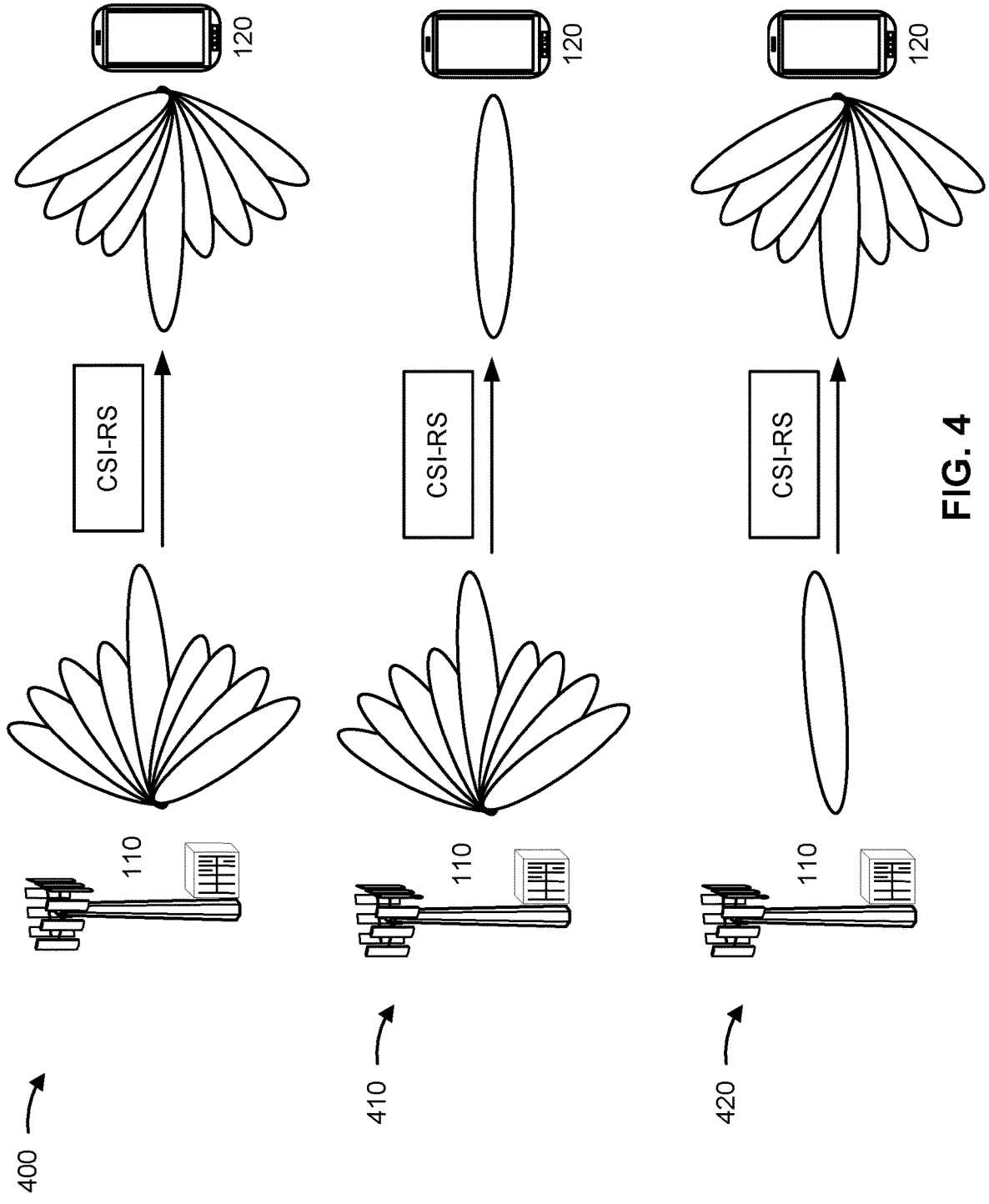
FIG. 4 is a diagram illustrating examples of beam management procedures, in accordance with the present disclosure.

FIG. 4 is a diagram illustrating examples 400, 410, and 420 of beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

During a beam management, a network node may transmit a plurality of reference signals associated with different beams. The network node may transmit the plurality of reference signals as part of a beam sweeping. A UE may perform measurements of the plurality of reference signals. The UE may prepare a measurement report based at least in part on the measurements. The UE may transmit the measurement report to the network node. The measurement report may be an L1 RSRP measurement report or an L1 SINR measurement report. An L1 RSRP/SINR measurement report may indicate a beam index, RSRP/SINR values, and differential RSRP/SINR values. The beam index may be encoded using six or seven bits. A strongest RSRP/SINR value, among reported RSRP/SINR values, may be reported using seven bits (e.g., from −140 decibel milliwatts (dBm) to −45 dBm with a 1 decibel (dB) resolution), and remaining RSRP/SINR values may be reported based at least in part on a differential RSRP/SINR using four bits (e.g., from 0 dBm to −30 dB with a 2 dB resolution).

As an example, an L1 RSRP/SINR measurement report may indicate four RSRP/SINR measurements. For 64 SSBs, 7+(4×3) bits (19 bits) may be used to report a strongest RSRP/SINR value, and (6×4) bits (24 bits) may be used to report differential RSRP/SINR values, for a total of 43 bits. For reporting four RSRP/SINR measurements out of 128 CSI-RSs, 47 bits may be used.

A CSI-RS resource indicator (CRI) may be associated with a defined bit width. An SSB resource indicator (SSBRI) may be associated with a defined bit width. An RSRP/SINR value may be associated with a bit width of seven. A differential RSRP/SINR value may be associated with a bit width of four. A channel state information (CSI) report may include a plurality of CSI fields. For example, the CSI report may indicate a CRI or SSBRI #1, a CRI or SSBRI #2, a CRI or SSBRI #3, a CRI or SSBRI #4, an RSRP/SINR #1, a differential RSRP/SINR #2, a differential RSRP/SINR #3, and/or a differential RSRP/SINR #4.

Four RSRP/SINR values may be reported in an L1 RSRP/SINR measurement report using 40 to 50 bits, which may be based at least in part on the L1 RSRP/SINR measurement report indicating the beam index, the RSRP/SINR values, and the differential RSRP/SINR values. However, as noted above, for some applications, additional RSRP/SINR values may need to be reported. For example, when monitoring SSBs of multiple cells, a UE may need to report 40 or more bits for each cell, which may be a considerable payload. Further, for some applications, differential RSRP/SINR values for four beams may not be sufficient. For example, for beam prediction using AI/ML, 8 or 16 beams may be needed to predict an RSRP/SINR value of a narrow CSI-RS beam from measured RSRP/SINR values of SSB beams. Thus, for some applications, a quantity of bits may need to be reduced or compressed for reporting L1 RSRP/SINR values to the network node.

In various aspects of techniques and apparatuses described herein, a UE may receive, from a network node, a reference signal associated with a beam management. The UE may perform an L1 RSRP/SINR measurement based at least in part on the reference signal. The UE may determine, based at least in part on a search of a LUT, an entry in the LUT that corresponds to the L1 RSRP/SINR measurement. In other words, the UE may search the LUT, which may be locally stored at the UE, for an entry that matches the L1 RSRP/SINR measurement. The entry in the LUT may correspond to a beam index associated with the L1 RSRP/SINR measurement and/or an RSRP/SINR value associated with the L1 RSRP/SINR measurement. The UE may transmit, to the network node, an L1 RSRP/SINR measurement report that indicates the entry in the LUT.

In some aspects, the UE may use the LUT for the L1 RSRP/SINR measurement report. The UE may use the LUT to reduce the quantity of bits needed for the L1 RSRP/SINR measurement report. The LUT may be built online, separately for the UE or jointly for a plurality of UEs. The LUT may be updated when a new L1 RSRP/SINR measurement is not represented by an entry in the LUT. The LUT may be compressed, which may further reduce the quantity of bits needed for the L1 RSRP/SINR measurement report. The LUT may be configured using an L1 RSRP/SINR configuration message, which may be transmitted over the air from the network node to the UE. The UE may report, to the network node, an entry from the LUT that is indicative of the L1 RSRP/SINR measurement. The UE may report the entry using an L1 RSRP/SINR reporting format. As a result, the L1 RSRP/SINR measurement report may use fewer bits, which may be useful for certain applications that require additional RSRP/SINR values (e.g., AI/ML-based beam prediction). The reduced signaling overhead that results from the L1 RSRP/SINR measurement report may improve a performance of the UE and/or the network node, and may reduce a network congestion.

Figure 5:
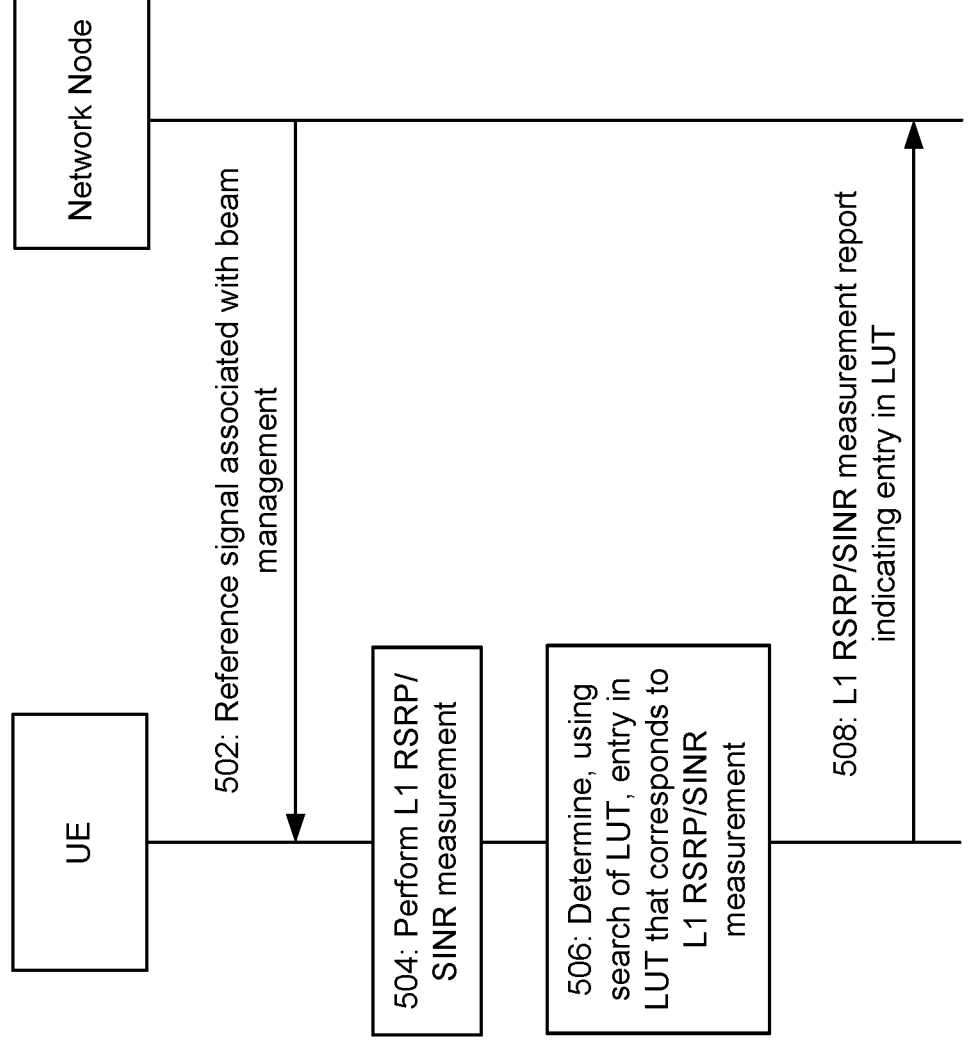
FIG. 5 is a diagram illustrating an example associated with measurement reporting using a lookup table (LUT), in accordance with the present disclosure.

FIG. 5 is a diagram illustrating an example 500 associated with measurement reporting using a LUT, in accordance with the present disclosure. As shown in FIG. 5, example 500 includes communication between a UE (e.g., UE 120) and a network node (e.g., network node 110). In some aspects, the UE and the network node may be included in a wireless network, such as wireless network 100.

As shown by reference number 502, the UE may receive, from the network node, a reference signal associated with a beam management. The reference signal may be associated with a beam. The reference signal may be one of a plurality of reference signals associated with different beams. The network node may transmit the plurality of reference signals as part of a beam sweeping. The reference signals may be CSI-RSs or SSBs.

As shown by reference number 504, the UE may perform an L1 RSRP/SINR measurement based at least in part on the reference signal. In other words, the UE may measure an L1 RSRP/SINR value associated with the reference signal that is received from the network node.

As shown by reference number 506, the UE may determine, based at least in part on a search of a LUT, an entry in the LUT that corresponds to the L1 RSRP/SINR measurement. The UE may search the LUT for the entry that corresponds to the L1 RSRP/SINR measurement. The entry in the LUT may correspond to a beam index associated with the L1 RSRP/SINR measurement and/or an RSRP/SINR value associated with the L1 RSRP/SINR measurement. In some aspects, the LUT may include a first LUT and a second LUT, where the first LUT may include beam indexes associated with L1 RSRP/SINR measurements, and the second LUT may include RSRP/SINR values associated with L1 RSRP/SINR measurements. The UE may search the first LUT for an entry that matches a beam index associated with the L1 RSRP/SINR measurement. The UE may search the second LUT for an entry that matches an RSRP/SINR value associated with the L1 RSRP/SINR measurement. In some aspects, the LUT may be a single LUT that includes beam indexes and RSRP/SINR values associated with L1 RSRP/SINR measurements. The UE may search the LUT for an index that matches both the beam index associated with the L1 RSRP/SINR measurement and the RSRP/SINR value associated with the L1 RSRP/SINR measurement.

In some aspects, the entry in the LUT that corresponds to the L1 RSRP/SINR measurement may be a closest entry in the LUT that corresponds to the L1 RSRP/SINR measurement. The UE may determine, based at least in part on the search of the LUT, that no existing entry in the LUT matches the L1 RSRP/SINR measurement. In other words, the UE may not find the beam index and/or RSRP/SINR value associated with the L1 RSRP/SINR measurement in the LUT, but the UE may find another beam index and/or RSRP/SINR value that is relatively close to the L1 RSRP/SINR measurement in the LUT. A difference between the beam indexes and/or the RSRP/SINR values may be within a threshold. The UE may select the entry in the LUT that is associated with the relatively close beam index and/or RSRP/SINR value.

As an example, to report four L1 RSRP/SINR values from 64 RSRP/SINR measurements, the quantity of all possible beam indexes is 64×63×62×61=15,249,024, and the quantity of all possible RSRP/SINR values is 95×16×16×16=389, 120, but not all combinations will appear. In some aspects, in a LUT-based scheme, the LUT may be built using beam indexes and/or RSRP/SINR values that have occurred relatively frequently in an environment. The UE may perform a new measurement, and the UE may need to report a corresponding beam index and RSRP/SINR value. When the corresponding beam index and/or RSRP/SINR value is indicated in the LUT, the UE may report an entry of the beam index and/or the RSRP/SINR value in the LUT. In other words, the UE may not report the beam index and/or the RSRP/SINR value itself, but rather the entry from the LUT that corresponds to the beam index and/or the RSRP/SINR value. When the UE performs the new measurement, and the corresponding beam index and/or RSRP/SINR value is not in the LUT, the UE may report a closest entry in the LUT. For example, the UE may report an entry of a beam index and/or an RSRP/SINR value in the LUT that is relatively close to the corresponding beam index and/or RSRP/SINR value of the new measurement. The closest entry in the LUT may be based at least in part on a bitstream distance, which may be based at least in part on a Hamming distance associated with beams, and ordered by RSRP/SINR values of the beams.

In some aspects, the UE may receive, from the network node, the LUT that includes a plurality of entries corresponding to possible L1 RSRP/SINR measurements. The UE may store the LUT in a memory of the UE. The UE may access the LUT, which may be locally stored on the UE, when determining the entry in the LUT that corresponds to the L1 RSRP/SINR measurement. The LUT may be locally stored by both the network node and the UE. In some aspects, the LUT may be an ordered LUT based at least in part on a natural order of bitstreams stored in the LUT. The beam indexes and/or the RSRP/SINR values may be represented by bitstreams, and the bitstreams may be arranged in a specific order (e.g., from lowest values to highest values), which may allow the UE to search the LUT for entries in the LUT with less complexity.

In some aspects, the LUT may be a UE-specific LUT. In other words, the LUT may be dedicated to the UE. In other aspects, the LUT may be a common LUT shared by a plurality of UEs. In this case, the network node may transmit the same LUT to the plurality of UEs.

In some aspects, the network node may build the LUT. The network node may transmit the LUT to the UE. The LUT may be stored locally at both the network node and the UE. In some aspects, the network node may build different LUTs for different UEs. The network node may transmit the different LUTs to the different UEs, respectively. In some aspects, multiple UEs may share the same LUT. When LUTs of different UEs have a relatively high amount of intersection, the network node may build a common LUT by taking a union of the LUTs of the different UEs. The network node may broadcast or multicast the common LUT to the different UEs. Further, the sharing of the common LUT may be based at least in part on location. For example, the network node may share the common LUT with only UEs that are within a certain distance from the network node.

In some aspects, for an L1 measurement, the UE may generate a bitstream for the beam index and the RSRP/SINR value. An entry for the bitstream may be added to the LUT when the bitstream is not currently represented by the LUT. The network node may build the LUT for RSRP/SINR values (e.g., a first LUT for RSRP/SINR values). For example, the network node may build the LUT for an RSRP/SINR value bitstream. In some cases, the network node may build the LUT based at least in part on the RSRP/SINR value and a differential RSRP/SINR value. In this case, a strongest RSRP/SINR value may be reported separately, and the network node may build the LUT based at least in part on a quantized differential RSRP/SINR value of the strongest RSRP/SINR value that is reported separately. The network node may build the LUT for beam indexes (e.g., a second LUT for beam indexes). For example, the network node may build the LUT for a beam index bitstream. In some cases, the network node may build the LUT based at least in part on the beam index and a differential beam index. In this case, a strongest beam index may be reported separately, and the network node may build the LUT based at least in part on the differential beam index (e.g., the beam index minus a strongest beam index) of the other reported beams.

In some aspects, the LUT may be an ordered table. An order may be a natural order of bitstreams stored in the LUT. As a result, the LUT may be more easily searched to identify entries that correspond to particular beam indexes and RSRP/SINR values. In some aspects, the network node may build the LUT for the RSRP/SINR values and the LUT for the beam indexes separately. In other words, separate LUTs may be built for the RSRP/SINR values and the beam indexes. Alternatively, the network node may build one common LUT for the beam indexes and the RSRP/SINR values.

As a first example, for 256 antennas and 64 beams, a UE may report the four best beams. The UE may use fewer bits when reporting the four best beams using a LUT-based approach, as compared to reporting the four best beams using a traditional approach. The traditional approach may include a first beam index, another beam index, a first RSRP/SINR value, and a differential value. The traditional approach may require a total of 43 bits, but the LUT-based approach may require less than 43 bits (e.g., 34 to 40 bits, depending on whether differential RSRP/SINR values and/ or differential beam index values are used in the LUT).

As a second example, for 128 antennas and 64 beams, a UE may report the four best beams. The UE may use fewer bits when reporting the four best beams using a LUT-based approach, as compared to reporting the four best beams using a traditional approach. The traditional approach may include a first beam index, another beam index, a first RSRP/SINR value, and a differential value. The traditional approach may require a total of 43 bits, but the LUT-based approach may require less than 43 bits (e.g., 35 to 38 bits, depending on whether differential RSRP/SINR values and/ or differential beam index values are used in the LUT).

In some aspects, the L1 RSRP/SINR measurement may be a first L1 RSRP/SINR measurement and the reference signal may be a first reference signal. The UE may perform a second L1 RSRP/SINR measurement, which may be based at least in part on a second reference signal associated with the beam management. The UE may determine, based at least in part on an additional search of the LUT, that no entry in the LUT corresponds to the second L1 RSRP/SINR measurement. The UE may transmit, to the network node, an indication of the second L1 RSRP/SINR measurement. In this case, since the UE did not find a corresponding entry in the LUT, the UE may transmit the second L1 RSRP/SINR measurement itself. The UE may transmit, to the network node, an indication of a beam index and/or an RSRP/SINR value, associated with the second L1 RSRP/SINR measurement, that are not currently in the LUT.

In some aspects, the UE may report, to the network node, a missing entry in the LUT. When the UE measurement does not match a corresponding beam index and/or RSRP/SINR value in the LUT, the UE may transmit the UE measurement to the network node. The UE may transmit the UE measurement based at least in part on an L1 measurement reporting. Alternatively, the UE may transmit, to the network node, a medium access control control element (MAC-CE), which may convey a beam index and/or an RSRP/SINR value that is not currently in the LUT.

In some aspects, the LUT may be an initial LUT. The UE may transmit, to the network node, UE feedback. The UE feedback may indicate L1 RSRP/SINR measurements that are not in the initial LUT. For example, the UE feedback may indicate beam indexes and/or RSRP/SINR values that are not in the initial LUT. The network node may generate, based at least in part on the UE feedback, an updated LUT. The UE may receive, from the network node, the updated LUT. The updated LUT may include new entries for beam indexes and/or RSRP/SINR values. Entries in the initial LUT may be deleted in the updated LUT. For example, the updated LUT may include fewer entries and/or different entries as compared to the initial LUT. The updated LUT may be associated with a version number. The UE may delete the initial LUT. The UE may start using the updated LUT.

In some aspects, the network node may maintain the LUT. The network node may update the LUT based at least in part on the UE feedback. For example, the network node may update the LUT based at least in part on the UE measurement and/or the MAC-CE received from the UE. The network node may enlarge the LUT by incorporating new beam indexes and/or RSRP/SINR values, which were not previously in the LUT. The network node may create new entries in the LUT for the new beam indexes and/or RSRP/ SINR values. The enlarged LUT may potentially result in more bits needed for L1 RSRP/SINR reporting. The network node may delete least frequently occurred entries. The network node may delete entries that have not been seen for a relatively long period of time. For example, when a particular entry has not been indicated for a period of time that exceeds a time threshold, the network node may delete that entry from the LUT. The network node may maintain a database that tracks a frequency and a last indicated time of each entry in the LUT, which may enable the network node to delete particular entries. The network node may transmit an updated LUT to the UE. The updated LUT may indicate a version number, which may allow the UE to keep track of different LUTs and delete outdated LUTs from a memory of the UE.

In some aspects, the UE may transmit, to the network node, UE feedback. The UE feedback may indicate L1 RSRP/SINR measurements that are not in the LUT. The UE may receive, from the network node and based at least in part on the UE feedback, an indication of one or more entries to be inserted into the LUT or deleted from the LUT. The UE may update the LUT based at least in part on the indication received from the network node. In this case, the UE does not receive an entirely new LUT, but instead receives the indication of certain entries, which the UE may then use to update the LUT already stored on the UE.

In some aspects, the UE may receive the LUT (e.g., an initial LUT) from the network node. The LUT for beam indexes may include 216 entries. The LUT for RSRP/SINR values may include 214 entries. Using the LUT for L1 measurement reporting may involve a search in an ordered table. For example, the UE may search the LUT for an entry, which may then be reported to the network node. An update to the LUT may involve an in-order insertion of an entry in the LUT or an in-order deletion of an entry in the LUT, which may occur to the LUT stored at the network node. The network node may transmit, to the UE, entries to be inserted or deleted, such that the UE may update the LUT that is already stored at the UE. In other words, the UE may keep the same LUT, and may not need to receive the entire LUT again from the network node. In some cases, the LUT may be compressed to have fewer entries, which may further reduce the bits needed for the L1 measurement reporting.

In some aspects, the entry in the LUT may be associated with a counter indicating a quantity of times that the entry has been reported. The entry in the LUT may be associated with a timestamp indicating a time at which the entry was last reported. The entry may be kept in the LUT or deleted from the LUT based at least in part on the counter and the timestamp. Thus, only the newest entries in the LUT and/or the most frequently used entries in the LUT may be retained.

In some aspects, in order to compress the LUT, each entry in the LUT may be associated with a counter and a timestamp. The counter may indicate a total number of times that the entry has been reported. The timestamp may indicate a time at which the entry was last reported. Entries that have been reported more than k times and/or entries that have been used in the last t seconds may be kept in the LUT, and remaining entries may be discarded from the LUT. In this case, k and t may be adapted with the bits needed to encode an entry of the LUT. In some aspects, in order to compress the LUT, entries that have a relatively close neighbor entry in the LUT may be removed from the LUT. When using the relatively close neighbor entry, instead of the entry that was removed, a beam index and/or RSRP/SINR value error may be smaller than a threshold.

As an example, the quantity of bits needed for reporting four beams, after removing less frequent entries, may be less than the quantity of bits needed for reporting four beams when the less frequent entries are not removed. The quantity of less frequent entries that are removed may correlate with the quantity of bits needed for reporting the four beams. For example, removing a larger quantity of less frequent entries from the LUT may reduce the quantity of bits needed by 1-3 bits.

In some aspects, the UE may receive, from the network node, an L1 RSRP/SINR configuration message. The UE may download, from the network node, the LUT based at least in part on the L1 RSRP/SINR configuration message. The UE may transmit the L1 RSRP/SINR measurement report that indicates the entry in the LUT based at least in part on the L1 RSRP/SINR configuration message. In other words, the network node may transmit, to the UE, an L1 RSRP/SINR configuration message that configures the UE to download the LUT and transmit the L1 RSRP/SINR measurement report.

In some aspects, the LUT may be an initial LUT. The UE may receive, from the network node, a broadcast message that indicates that a new LUT is available. The broadcast message may indicate a version number associated with the new LUT. The UE may determine that the initial LUT is associated with a previous version as compared to the new LUT. The UE may transmit, to the network node, a request for the new LUT. The UE may receive, from the network node, the new LUT based at least in part on the request. The UE may replace the initial LUT with the new LUT.

As shown by reference number 508, the UE may transmit, to the network node, an L1 RSRP/SINR measurement report that indicates the entry in the LUT. The entry may correspond to the L1 RSRP/SINR measured by the UE. The L1 RSRP/SINR measurement report may include one bit to indicate an L1 RSRP/SINR reporting format. The L1 RSRP/SINR reporting format may indicate that the L1 RSRP/SINR measurement report is based at least in part on the LUT. Alternatively, the L1 RSRP/SINR reporting format may indicate that the L1 RSRP/SINR measurement report is based at least in part on a non-LUT scheme.

In some aspects, the UE may perform an L1 RSRP/SINR measurement reporting, and the network node may build the LUT based at least in part on the L1 RSRP/SINR measurement reporting. After the network node determines that the LUT is built, the network node may configure the UE to download the LUT. The network node may determine that the LUT has been built based at least in part on a network node implementation. The network node may determine that the LUT has been built based at least in part on the LUT not being updated for a certain period of time, or based at least in part on a quantity of updates being below a threshold. The network node may configure, via an L1 RSRP/SINR configuration message, the UE to report an L1 RSRP/SINR measurement using the LUT. For example, the network node may configure the UE to look up an entry in the LUT that corresponds to the L1 RSRP/SINR measurement, and then report the entry to the network node. The network node may configure the UE to use the LUT to report the L1 RSRP/SINR measurement using RRC signaling, a MAC-CE, or DCI. The network node may broadcast a message indicating that the LUT is ready, together with a current version number of the LUT, and then the network node may transmit the LUT to the UE based at least in part on a UE request. The UE may request the LUT from the network node when the UE does not have a latest LUT, which the UE may determine based at least in part on the current version number of the LUT indicated in the broadcast message.

In some aspects, the UE may transmit, to the network node, the L1 RSRP/SINR measurement report based at least in part on the L1 RSRP/SINR reporting format. In some aspects, the UE may add one bit to the L1 RSRP/SINR measurement report to indicate the L1 RSRP/SINR reporting format. For example, the one bit may indicate that the L1 RSRP/SINR measurement report is a LUT-based L1 RSRP/SINR measurement report, or the one bit may indicate that the L1 RSRP/SINR measurement report is a non-LUT-based L1 RSRP/SINR measurement report. Even when the network node configures the UE to perform LUT-based L1 RSRP/SINR measurement reporting, the UE may still utilize a non-LUT-based L1 RSRP/SINR measurement reporting when the UE does not have a latest LUT, or when the L1 RSRP/SINR measurement is not in the LUT.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with measurement reporting using a LUT.

As shown in FIG. 6, in some aspects, process 600 may include receiving, from a network node, a reference signal associated with a beam management (block 610). For example, the UE (e.g., using reception component 802 and/or communication manager 806, depicted in FIG. 8) may receive, from a network node, a reference signal associated with a beam management, as described above.

As further shown in FIG. 6, in some aspects, process 600 may include performing an L1 RSRP/SINR measurement based at least in part on the reference signal (block 620). For example, the UE (e.g., using communication manager 806, depicted in FIG. 8) may perform an L1 RSRP/SINR measurement based at least in part on the reference signal, as described above.

As further shown in FIG. 6, in some aspects, process 600 may include determining, based at least in part on a search of a LUT, an entry in the LUT that corresponds to the L1 RSRP/SINR measurement (block 630). For example, the UE (e.g., using communication manager 806, depicted in FIG. 8) may determine, based at least in part on a search of a LUT, an entry in the LUT that corresponds to the L1 RSRP/SINR measurement, as described above.

As further shown in FIG. 6, in some aspects, process 600 may include transmitting, to the network node, an L1 RSRP/SINR measurement report that indicates the entry in the LUT (block 640). For example, the UE (e.g., using transmission component 804 and/or communication manager 806, depicted in FIG. 8) may transmit, to the network node, an L1 RSRP/SINR measurement report that indicates the entry in the LUT, as described above.

Process 600 may include additional aspects, such as any single aspect or any combination of aspects described below and/or in connection with one or more other processes described elsewhere herein.

In a first aspect, the entry in the LUT that corresponds to the L1 RSRP/SINR measurement is a closest entry in the LUT that corresponds to the L1 RSRP/SINR measurement.

In a second aspect, alone or in combination with the first aspect, the LUT is a UE-specific LUT, or the LUT is a common LUT shared by a plurality of UEs.

In a third aspect, alone or in combination with one or more of the first and second aspects, process 600 includes receiving, from the network node, the LUT that includes a plurality of entries corresponding to possible L1 RSRP/SINR measurements, and storing the LUT in a memory of the UE.

In a fourth aspect, alone or in combination with one or more of the first through third aspects, the entry in the LUT corresponds to one or more of a beam index associated with the L1 RSRP/SINR measurement or an RSRP/SINR value associated with the L1 RSRP/SINR measurement.

In a fifth aspect, alone or in combination with one or more of the first through fourth aspects, the LUT includes a first LUT and a second LUT, the first LUT includes beam indexes associated with L1 RSRP/SINR measurements, and the second LUT includes RSRP/SINR values associated with L1 RSRP/SINR measurements.

In a sixth aspect, alone or in combination with one or more of the first through fifth aspects, the LUT is a single LUT that includes beam indexes and RSRP/SINR values associated with L1 RSRP/SINR measurements.

In a seventh aspect, alone or in combination with one or more of the first through sixth aspects, the L1 RSRP/SINR measurement is a first L1 RSRP/SINR measurement, and process 600 includes performing a second L1 RSRP/SINR measurement, determining, based at least in part on an additional search of the LUT, that no entry in the LUT corresponds to the second L1 RSRP/SINR measurement, and transmitting, to the network node, an indication of the second L1 RSRP/SINR measurement, or an indication of one or more of a beam index or an RSRP/SINR value, associated with the second L1 RSRP/SINR measurement, that are not currently in the LUT.

In an eighth aspect, alone or in combination with one or more of the first through seventh aspects, the LUT is an initial LUT, and process 600 includes transmitting, to the network node, UE feedback, receiving, from the network node and based at least in part on the UE feedback, an updated LUT, wherein the updated LUT includes new entries for one or more of beam indexes or RSRP/SINR values, wherein entries in the initial LUT are deleted in the updated LUT, and the updated LUT is associated with a version number, and deleting the initial LUT.

In a ninth aspect, alone or in combination with one or more of the first through eighth aspects, process 600 includes transmitting, to the network node, UE feedback, receiving, from the network node and based at least in part on the UE feedback, an indication of one or more entries to be inserted into the LUT or deleted from the LUT, and updating the LUT based at least in part on the indication received from the network node.

In a tenth aspect, alone or in combination with one or more of the first through ninth aspects, the entry in the LUT is associated with a counter indicating a quantity of times that the entry has been reported, wherein the entry in the LUT is associated with a timestamp indicating a time that the entry was last reported, and wherein the entry is kept in the LUT or deleted from the LUT based at least in part on the counter and the timestamp.

In an eleventh aspect, alone or in combination with one or more of the first through tenth aspects, process 600 includes receiving, from the network node, an L1 RSRP/SINR configuration message, and downloading, from the network node, the LUT based at least in part on the L1 RSRP/SINR configuration message, wherein the L1 RSRP/SINR measurement report that indicates the entry in the LUT is transmitted based at least in part on the L1 RSRP/SINR configuration message.

In a twelfth aspect, alone or in combination with one or more of the first through eleventh aspects, the LUT is an initial LUT, and process 600 includes receiving, from the network node, a broadcast message that indicates that a new LUT is available, wherein the broadcast message indicates a version number associated with the new LUT, determining that the initial LUT is associated with a previous version as compared to the new LUT, transmitting, to the network node, a request for the new LUT, receiving, from the network node, the new LUT based at least in part on the request, and replacing the initial LUT with the new LUT.

In a thirteenth aspect, alone or in combination with one or more of the first through twelfth aspects, the L1 RSRP/SINR measurement report includes one bit to indicate an L1 RSRP/SINR reporting format, and the L1 RSRP/SINR reporting format indicates that the L1 RSRP/SINR measurement report is based at least in part on the LUT.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
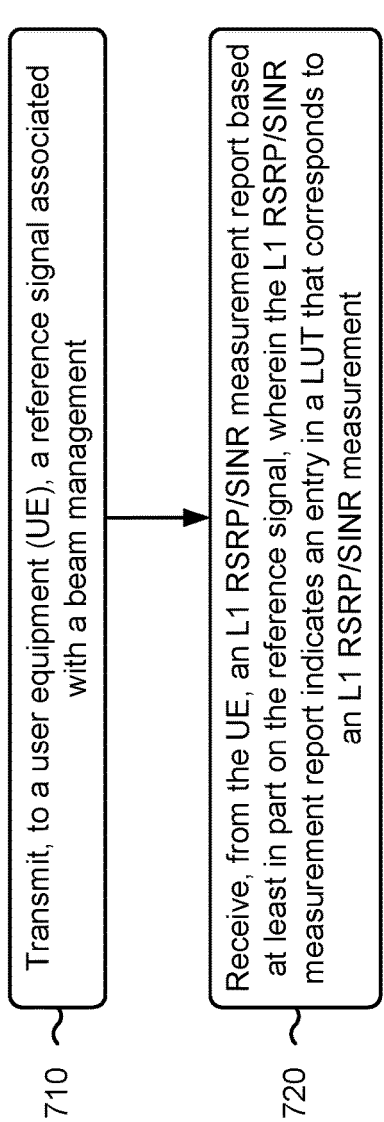

FIG. 7 is a diagram illustrating an example process 700 performed, for example, by a network node, in accordance with the present disclosure. Example process 700 is an example where the network node (e.g., network node 110) performs operations associated with measurement reporting using a LUT.

As shown in FIG. 7, in some aspects, process 700 may include transmitting, to a UE, a reference signal associated with a beam management (block 710). For example, the network node (e.g., using transmission component 904 and/or communication manager 906, depicted in FIG. 9) may transmit, to a UE, a reference signal associated with a beam management, as described above.

As further shown in FIG. 7, in some aspects, process 700 may include receiving, from the UE, an L1 RSRP/SINR measurement report based at least in part on the reference signal, wherein the L1 RSRP/SINR measurement report indicates an entry in a LUT that corresponds to an L1 RSRP/SINR measurement (block 720). For example, the network node (e.g., using reception component 902 and/or communication manager 906, depicted in FIG. 9) may receive, from the UE, an L1 RSRP/SINR measurement report based at least in part on the reference signal, wherein the L1 RSRP/SINR measurement report indicates an entry in a LUT that corresponds to an L1 RSRP/SINR measurement, as described above.

Process 700 may include additional aspects, such as any single aspect or any combination of aspects described below and/or in connection with one or more other processes described elsewhere herein.

In a first aspect, the entry in the LUT that corresponds to the L1 RSRP/SINR measurement is a closest entry in the LUT that corresponds to the L1 RSRP/SINR measurement.

In a second aspect, alone or in combination with the first aspect, the LUT is a UE-specific LUT, or the LUT is a common LUT shared by a plurality of UEs.

In a third aspect, alone or in combination with one or more of the first and second aspects, process 700 includes transmitting, to the UE, the LUT that includes a plurality of entries corresponding to possible L1 RSRP/SINR measurements, wherein the LUT is locally stored by both the network node and the UE.

In a fourth aspect, alone or in combination with one or more of the first through third aspects, the entry in the LUT corresponds to one or more of a beam index associated with the L1 RSRP/SINR measurement or an RSRP/SINR value associated with the L1 RSRP/SINR measurement.

In a fifth aspect, alone or in combination with one or more of the first through fourth aspects, the LUT includes a first LUT and a second LUT, the first LUT includes beam indexes associated with L1 RSRP/SINR measurements, and the second LUT includes RSRP/SINR values associated with L1 RSRP/SINR measurements.

In a sixth aspect, alone or in combination with one or more of the first through fifth aspects, the LUT is a single LUT that includes beam indexes and RSRP/SINR values associated with L1 RSRP/SINR measurements.

In a seventh aspect, alone or in combination with one or more of the first through sixth aspects, the L1 RSRP/SINR measurement is a first L1 RSRP/SINR measurement, and process 700 includes receiving, from the UE, an indication of a second L1 RSRP/SINR measurement, or an indication of one or more of a beam index or an RSRP/SINR value, associated with the second L1 RSRP/SINR measurement, that are not currently in the LUT.

In an eighth aspect, alone or in combination with one or more of the first through seventh aspects, the LUT is an initial LUT, and process 700 includes receiving, from the UE, UE feedback, and transmitting, to the UE and based at least in part on the UE feedback, an updated LUT, wherein the updated LUT includes new entries for one or more of beam indexes or RSRP/SINR values, wherein entries in the initial LUT are deleted in the updated LUT, and the updated LUT is associated with a version number.

In a ninth aspect, alone or in combination with one or more of the first through eighth aspects, process 700 includes receiving, from the UE, UE feedback, and transmitting, to the UE and based at least in part on the UE feedback, an indication of one or more entries to be inserted into the LUT or deleted from the LUT.

In a tenth aspect, alone or in combination with one or more of the first through ninth aspects, the entry in the LUT is associated with a counter indicating a quantity of times that the entry has been reported, wherein the entry in the LUT is associated with a timestamp indicating a time that the entry was last reported, and the entry is kept in the LUT or deleted from the LUT based at least in part on the counter and the timestamp.

In an eleventh aspect, alone or in combination with one or more of the first through tenth aspects, process 700 includes transmitting, to the UE, an L1 RSRP/SINR configuration message that configures the UE to download the LUT and transmit the L1 RSRP/SINR measurement report.

In a twelfth aspect, alone or in combination with one or more of the first through eleventh aspects, the LUT is an initial LUT, and process 700 includes transmitting, to the UE, a broadcast message that indicates that a new LUT is available, wherein the broadcast message indicates a version number associated with the new LUT, receiving, from the UE and based at least in part on the broadcast message, a request for the new LUT, and transmitting, to the UE, the new LUT based at least in part on the request.

In a thirteenth aspect, alone or in combination with one or more of the first through twelfth aspects, the L1 RSRP/SINR measurement report includes one bit to indicate an L1 RSRP/SINR reporting format, and the L1 RSRP/SINR reporting format indicates that the L1 RSRP/SINR measurement report is based at least in part on the LUT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
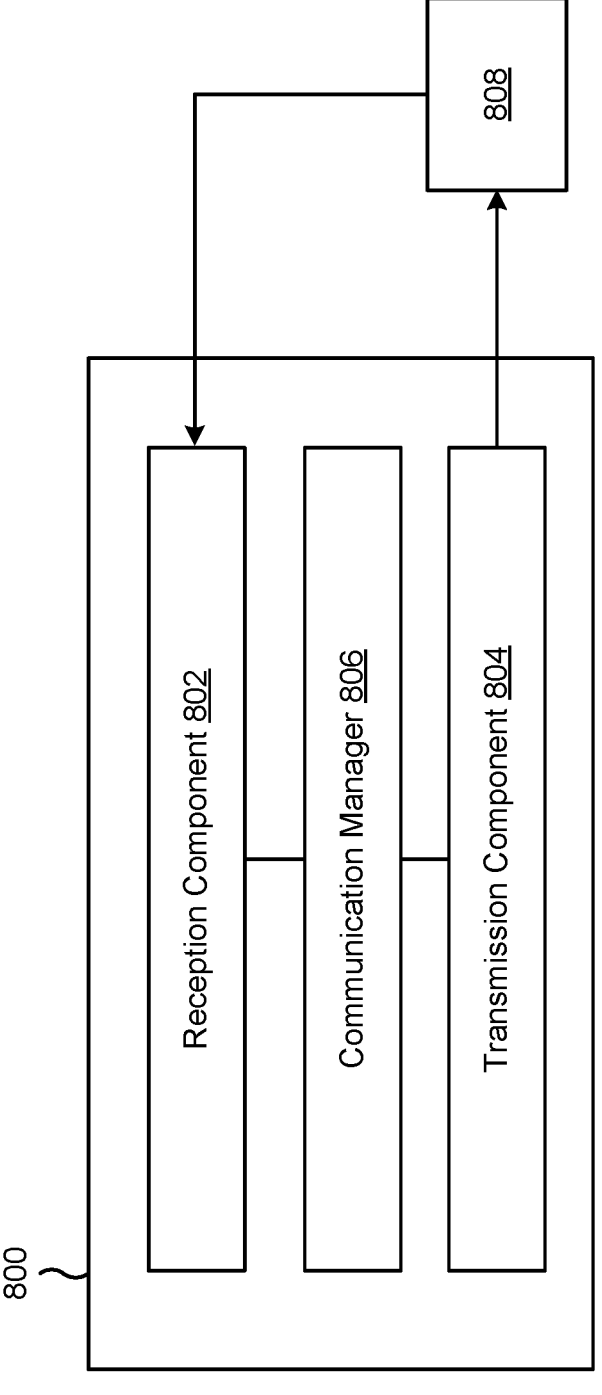
FIGS. 8-9 are diagrams of example apparatuses for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive, from a network node, a reference signal associated with a beam management. The communication manager 806 may perform an L1 RSRP/SINR measurement based at least in part on the reference signal. The communication manager 806 may determine, based at least in part on a search of a LUT, an entry in the LUT that corresponds to the L1 RSRP/SINR measurement. The transmission component 804 may transmit, to the network node, an L1 RSRP/SINR measurement report that indicates the entry in the LUT.

The reception component 802 may receive, from the network node, the LUT that includes a plurality of entries corresponding to possible L1 RSRP/SINR measurements. The communication manager 806 may store the LUT in a memory of the UE.

The communication manager 806 may perform a second L1 RSRP/SINR measurement. The communication manager 806 may determine, based at least in part on an additional search of the LUT, that no entry in the LUT corresponds to the second L1 RSRP/SINR measurement. The transmission component 804 may transmit, to the network node, an indication of the second L1 RSRP/SINR measurement, or an indication of one or more of a beam index or an RSRP/SINR value, associated with the second L1 RSRP/SINR measurement, that are not currently in the LUT.

The transmission component 804 may transmit, to the network node, UE feedback. The reception component 802 may receive, from the network node and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number. The communication manager 806 may delete the initial LUT.

The transmission component 804 may transmit, to the network node, UE feedback. The reception component 802 may receive, from the network node and based at least in part on the UE feedback, an indication of one or more entries to be inserted into the LUT or deleted from the LUT. The communication manager 806 may update the LUT based at least in part on the indication received from the network node.

The reception component 802 may receive, from the network node, an L1 RSRP/SINR configuration message. The communication manager 806 may download, from the network node, the LUT based at least in part on the L1 RSRP/SINR configuration message.

The reception component 802 may receive, from the network node, a broadcast message that indicates that a new LUT is available, wherein the broadcast message indicates a version number associated with the new LUT. The communication manager 806 may determine that the initial LUT is associated with a previous version as compared to the new LUT. The transmission component 804 may transmit, to the network node, a request for the new LUT. The reception component 802 may receive, from the network node, the new LUT based at least in part on the request. The communication manager 806 may replace the initial LUT with the new LUT.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
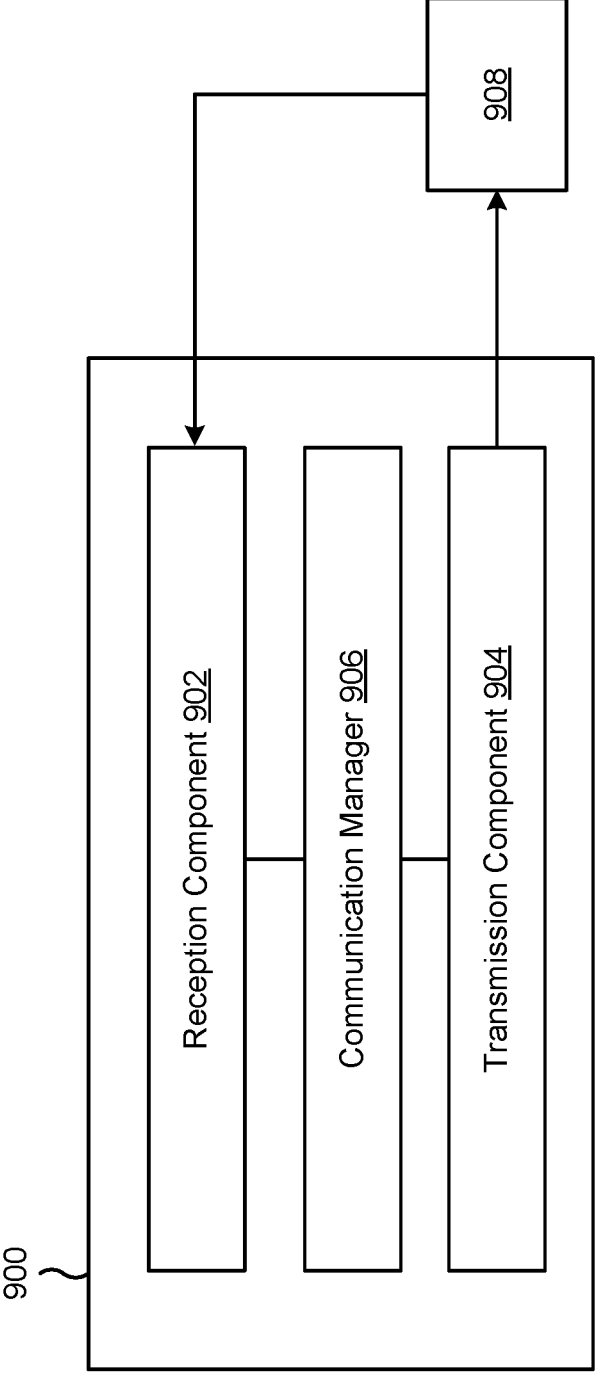

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit, to a UE, a reference signal associated with a beam management. The reception component 902 may receive, from the UE, an L1 RSRP/SINR measurement report based at least in part on the reference signal, wherein the L1 RSRP/SINR measurement report indicates an entry in a LUT that corresponds to an L1 RSRP/SINR measurement.

The transmission component 904 may transmit, to the UE, the LUT that includes a plurality of entries corresponding to possible L1 RSRP/SINR measurements, wherein the LUT is locally stored by both the network node and the UE. The reception component 902 may receive, from the UE, an indication of a second L1 RSRP/SINR measurement, or an indication of one or more of a beam index or an RSRP/SINR value, associated with the second L1 RSRP/SINR measurement, that are not currently in the LUT.

The reception component 902 may receive, from the UE, UE feedback. The transmission component 904 may transmit, to the UE and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number.

The reception component 902 may receive, from the UE, UE feedback. The transmission component 904 may transmit, to the UE and based at least in part on the UE feedback, an indication of one or more entries to be inserted into the LUT or deleted from the LUT. The transmission component 904 may transmit, to the UE, an L1 RSRP/SINR configuration message that configures the UE to download the LUT and transmit the L1 RSRP/SINR measurement report.

The transmission component 904 may transmit, to the UE, a broadcast message that indicates that a new LUT is available, wherein the broadcast message indicates a version number associated with the new LUT. The reception component 902 may receive, from the UE and based at least in part on the broadcast message, a request for the new LUT. The transmission component 904 may transmit, to the UE, the new LUT based at least in part on the request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a network node, a reference signal associated with a beam management; performing a layer 1 (L1) reference signal received power (RSRP) or an L1 signal-to-interference-plus-noise ratio (SINR) (RSRP/SINR) measurement based at least in part on the reference signal; determining, based at least in part on a search of a lookup table (LUT), an entry in the LUT that corresponds to the L1 RSRP/SINR measurement; and transmitting, to the network node, an L1 RSRP/SINR measurement report that indicates the entry in the LUT.

Aspect 2: The method of Aspect 1, wherein the entry in the LUT that corresponds to the L1 RSRP/SINR measurement is a closest entry in the LUT that corresponds to the L1 RSRP/SINR measurement.

Aspect 3: The method of any of Aspects 1-2, wherein the LUT is a UE-specific LUT, or the LUT is a common LUT shared by a plurality of UEs.

Aspect 4: The method of any of Aspects 1-3, further comprising: receiving, from the network node, the LUT that includes a plurality of entries corresponding to possible L1 RSRP/SINR measurements; and storing the LUT in a memory of the UE.

Aspect 5: The method of any of Aspects 1-4, wherein the entry in the LUT corresponds to one or more of a beam index associated with the L1 RSRP/SINR measurement or an RSRP/SINR value associated with the L1 RSRP/SINR measurement.

Aspect 6: The method of any of Aspects 1-5, wherein the LUT includes a first LUT and a second LUT, wherein the first LUT includes beam indexes associated with L1 RSRP/SINR measurements, and wherein the second LUT includes RSRP/SINR values associated with L1 RSRP/SINR measurements.

Aspect 7: The method of any of Aspects 1-6, wherein the LUT is a single LUT that includes beam indexes and RSRP/SINR values associated with L1 RSRP/SINR measurements.

Aspect 8: The method of any of Aspects 1-7, wherein the L1 RSRP/SINR measurement is a first L1 RSRP/SINR measurement, and further comprising: performing a second L1 RSRP/SINR measurement; determining, based at least in part on an additional search of the LUT, that no entry in the LUT corresponds to the second L1 RSRP/SINR measurement; and transmitting, to the network node, an indication of the second L1 RSRP/SINR measurement, or an indication of one or more of a beam index or an RSRP/SINR value, associated with the second L1 RSRP/SINR measurement, that are not currently in the LUT.

Aspect 9: The method of any of Aspects 1-8, wherein the LUT is an initial LUT, and further comprising: transmitting, to the network node, UE feedback; receiving, from the network node and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number; and deleting the initial LUT.

Aspect 10: The method of any of Aspects 1-9, further comprising: transmitting, to the network node, UE feedback; receiving, from the network node and based at least in part on the UE feedback, an indication of one or more entries to be inserted into the LUT or deleted from the LUT; and updating the LUT based at least in part on the indication received from the network node.

Aspect 11: The method of any of Aspects 1-10, wherein the entry in the LUT is associated with a counter indicating a quantity of times that the entry has been reported, wherein the entry in the LUT is associated with a timestamp indicating a time that the entry was last reported, and wherein the entry is kept in the LUT or deleted from the LUT based at least in part on the counter and the timestamp.

Aspect 12: The method of any of Aspects 1-11, further comprising: receiving, from the network node, an L1 RSRP/SINR configuration message; and downloading, from the network node, the LUT based at least in part on the L1 RSRP/SINR configuration message, wherein the L1 RSRP/SINR measurement report that indicates the entry in the LUT is transmitted based at least in part on the L1 RSRP/SINR configuration message.

Aspect 13: The method of any of Aspects 1-12, wherein the LUT is an initial LUT, and further comprising: receiving, from the network node, a broadcast message that indicates that a new LUT is available, wherein the broadcast message indicates a version number associated with the new LUT; determining that the initial LUT is associated with a previous version as compared to the new LUT; transmitting, to the network node, a request for the new LUT; receiving, from the network node, the new LUT based at least in part on the request; and replacing the initial LUT with the new LUT.

Aspect 14: The method of any of Aspects 1-13, wherein the L1 RSRP/SINR measurement report includes one bit to indicate an L1 RSRP/SINR reporting format, and wherein the L1 RSRP/SINR reporting format indicates that the L1 RSRP/SINR measurement report is based at least in part on the LUT.

Aspect 15: A method of wireless communication performed by a network node, comprising: transmitting, to a user equipment (UE), a reference signal associated with a beam management; and receiving, from the UE, a layer 1 (L1) reference signal received power (RSRP) or an L1 signal-to-interference-plus-noise ratio (SINR) (RSRP/SINR) measurement report based at least in part on the reference signal, wherein the L1 RSRP/SINR measurement report indicates an entry in a lookup table (LUT) that corresponds to an L1 RSRP/SINR measurement.

Aspect 16: The method of Aspect 15, wherein the entry in the LUT that corresponds to the L1 RSRP/SINR measurement is a closest entry in the LUT that corresponds to the L1 RSRP/SINR measurement.

Aspect 17: The method of any of Aspects 15-16, wherein the LUT is a UE-specific LUT, or the LUT is a common LUT shared by a plurality of UEs.

Aspect 18: The method of any of Aspects 15-17, further comprising: transmitting, to the UE, the LUT that includes a plurality of entries corresponding to possible L1 RSRP/SINR measurements, wherein the LUT is locally stored by both the network node and the UE.

Aspect 19: The method of any of Aspects 15-18, wherein the entry in the LUT corresponds to one or more of a beam index associated with the L1 RSRP/SINR measurement or an RSRP/SINR value associated with the L1 RSRP/SINR measurement.

Aspect 20: The method of any of Aspects 15-19, wherein the LUT includes a first LUT and a second LUT, wherein the first LUT includes beam indexes associated with L1 RSRP/SINR measurements, and wherein the second LUT includes RSRP/SINR values associated with L1 RSRP/SINR measurements.

Aspect 21: The method of any of Aspects 15-20, wherein the LUT is a single LUT that includes beam indexes and RSRP/SINR values associated with L1 RSRP/SINR measurements.

Aspect 22: The method of any of Aspects 15-21, wherein the L1 RSRP/SINR measurement is a first L1 RSRP/SINR measurement, and further comprising: receiving, from the UE, an indication of a second L1 RSRP/SINR measurement, or an indication of one or more of a beam index or an RSRP/SINR value, associated with the second L1 RSRP/SINR measurement, that are not currently in the LUT.

Aspect 23: The method of any of Aspects 15-22, wherein the LUT is an initial LUT, and further comprising: receiving, from the UE, UE feedback; and transmitting, to the UE and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number.

Aspect 24: The method of any of Aspects 15-23, further comprising: receiving, from the UE, UE feedback; and transmitting, to the UE and based at least in part on the UE feedback, an indication of one or more entries to be inserted into the LUT or deleted from the LUT.

Aspect 25: The method of any of Aspects 15-24, wherein the entry in the LUT is associated with a counter indicating a quantity of times that the entry has been reported, wherein the entry in the LUT is associated with a timestamp indicating a time that the entry was last reported, and wherein the entry is kept in the LUT or deleted from the LUT based at least in part on the counter and the timestamp.

Aspect 26: The method of any of Aspects 15-25, further comprising: transmitting, to the UE, an L1 RSRP/SINR configuration message that configures the UE to download the LUT and transmit the L1 RSRP/SINR measurement report.

Aspect 27: The method of any of Aspects 15-26, wherein the LUT is an initial LUT, and further comprising: transmitting, to the UE, a broadcast message that indicates that a new LUT is available, wherein the broadcast message indicates a version number associated with the new LUT; receiving, from the UE and based at least in part on the broadcast message, a request for the new LUT; and transmitting, to the UE, the new LUT based at least in part on the request.

Aspect 28: The method of any of Aspects 15-27, wherein the L1 RSRP/SINR measurement report includes one bit to indicate an L1 RSRP/SINR reporting format, and wherein the L1 RSRP/SINR reporting format indicates that the L1 RSRP/SINR measurement report is based at least in part on the LUT.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a network node, a lookup table (LUT) and a reference signal associated with a beam management, wherein the LUT includes a plurality of entries corresponding to layer 1 (L1) reference signal received power (RSRP) or L1 signal-to-interference-plus-noise ratio (SINR) (RSRP/SINR) measurements;
perform a L1 RSRP/SINR measurement based at least in part on the reference signal;
determine, based at least in part on a search of the LUT, an entry in the LUT that corresponds to the L1 RSRP/SINR measurement; and
transmit, to the network node, an L1 RSRP/SINR measurement report that indicates the entry in the LUT.

2. The apparatus of claim 1, wherein the entry in the LUT that corresponds to the L1 RSRP/SINR measurement is a closest entry in the LUT that corresponds to the L1 RSRP/SINR measurement.

3. The apparatus of claim 1, wherein the LUT is a UE-specific LUT, or the LUT is a common LUT shared by a plurality of UEs.

4. The apparatus of claim 1, wherein the one or more processors are further configured to:
store the LUT in a memory of the UE, wherein the LUT is an ordered LUT based at least in part on a natural order of bitstreams stored in the LUT.

5. The apparatus of claim 1, wherein the entry in the LUT corresponds to one or more of a beam index associated with the L1 RSRP/SINR measurement or an RSRP/SINR value associated with the L1 RSRP/SINR measurement.

6. The apparatus of claim 1, wherein the LUT includes a first LUT and a second LUT, wherein the first LUT includes beam indexes associated with L1 RSRP/SINR measurements, and wherein the second LUT includes RSRP/SINR values associated with L1 RSRP/SINR measurements.

7. The apparatus of claim 1, wherein the LUT is a single LUT that includes beam indexes and RSRP/SINR values associated with L1 RSRP/SINR measurements.

8. The apparatus of claim 1, wherein the L1 RSRP/SINR measurement is a first L1 RSRP/SINR measurement, and wherein the one or more processors are further configured to:
perform a second L1 RSRP/SINR measurement;
determine, based at least in part on an additional search of the LUT, that no entry in the LUT corresponds to the second L1 RSRP/SINR measurement; and
transmit, to the network node, an indication of the second L1 RSRP/SINR measurement, or an indication of one or more of a beam index or an RSRP/SINR value, associated with the second L1 RSRP/SINR measurement, that are not currently in the LUT.

9. The apparatus of claim 1, wherein the LUT is an initial LUT, and wherein the one or more processors are further configured to:
transmit, to the network node, UE feedback;
receive, from the network node and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number; and
delete the initial LUT.

10. The apparatus of claim 1, wherein the one or more processors are further configured to:
transmit, to the network node, UE feedback;
receive, from the network node and based at least in part on the UE feedback, an indication of one or more entries to be inserted into the LUT or deleted from the LUT; and
update the LUT based at least in part on the indication received from the network node.

11. The apparatus of claim 1, wherein the entry in the LUT is associated with a counter indicating a quantity of times that the entry has been reported, wherein the entry in the LUT is associated with a timestamp indicating a time that the entry was last reported, and wherein the entry is kept in the LUT or deleted from the LUT based at least in part on the counter and the timestamp.

12. The apparatus of claim 1,
wherein the one or more processors are further configured to:
   receive, from the network node, an L1 RSRP/SINR configuration message; and
   download, from the network node, the LUT based at least in part on the L1 RSRP/SINR configuration message,
      wherein the L1 RSRP/SINR measurement report that indicates the entry in the LUT is transmitted based at least in part on the L1 RSRP/SINR configuration message.

13. The apparatus of claim 1,
wherein the LUT is an initial LUT, and wherein the one or more processors are further configured to:
   receive, from the network node, a broadcast message that indicates that a new LUT is available, wherein the broadcast message indicates a version number associated with the new LUT;
   determine that the initial LUT is associated with a previous version as compared to the new LUT;
   transmit, to the network node, a request for the new LUT;
   receive, from the network node, the new LUT based at least in part on the request; and
   replace the initial LUT with the new LUT.

14. The apparatus of claim 1,
wherein the L1 RSRP/SINR measurement report includes one bit to indicate an L1 RSRP/SINR reporting format, and wherein the L1 RSRP/SINR reporting format indicates whether the L1 RSRP/SINR measurement report is a LUT-based report or a non-LUT-based report.

15. An apparatus for wireless communication at a network node, comprising:
   a memory; and
   one or more processors, coupled to the memory, configured to:
      transmit, to a user equipment (UE), a lookup table (LUT) and a reference signal associated with a beam management, wherein the LUT includes a plurality of entries corresponding to layer 1 (L1) reference signal received power (RSRP) or L1 signal-to-interference-plus-noise ratio (SINR) (RSRP/SINR) measurements; and
      receive, from the UE, a L1 RSRP/SINR measurement report based at least in part on the reference signal, wherein the L1 RSRP/SINR measurement report indicates an entry in the LUT that corresponds to an L1 RSRP/SINR measurement.

16. The apparatus of claim 15,
wherein the entry in the LUT that corresponds to the L1 RSRP/SINR measurement is a closest entry in the LUT that corresponds to the L1 RSRP/SINR measurement.

17. The apparatus of claim 15,
wherein the LUT is a UE-specific LUT, or the LUT is a common LUT shared by a plurality of UEs.

18. The apparatus of claim 15,
wherein the one or more processors are further configured to:
store the LUT locally stored by both the network node and the UE.

19. The apparatus of claim 15,
wherein the entry in the LUT corresponds to one or more of a beam index associated with the L1 RSRP/SINR measurement or an RSRP/SINR value associated with the L1 RSRP/SINR measurement.

20. The apparatus of claim 15,
wherein the LUT includes a first LUT and a second LUT, wherein the first LUT includes beam indexes associated with L1 RSRP/SINR measurements, and wherein the second LUT includes RSRP/SINR values associated with L1 RSRP/SINR measurements.

21. The apparatus of claim 15,
wherein the LUT is a single LUT that includes beam indexes and RSRP/SINR values associated with L1 RSRP/SINR measurements.

22. The apparatus of claim 15,
wherein the L1 RSRP/SINR measurement is a first L1 RSRP/SINR measurement, and wherein the one or more processors are further configured to:
   receive, from the UE, an indication of a second L1 RSRP/SINR measurement, or an indication of one or more of a beam index or an RSRP/SINR value, associated with the second L1 RSRP/SINR measurement, that are not currently in the LUT.

23. The apparatus of claim 15,
wherein the LUT is an initial LUT, and wherein the one or more processors are further configured to:
   receive, from the UE, UE feedback; and
   transmit, to the UE and based at least in part on the UE feedback, an updated LUT, wherein the updated LUT includes new entries for one or more of beam indexes or RSRP/SINR values, wherein entries in the initial LUT are deleted in the updated LUT, and wherein the updated LUT is associated with a version number.

24. The apparatus of claim 15,
wherein the one or more processors are further configured to:
   receive, from the UE, UE feedback; and
   transmit, to the UE and based at least in part on the UE feedback, an indication of one or more entries to be inserted into the LUT or deleted from the LUT.

25. The apparatus of claim 15,
wherein the entry in the LUT is associated with a counter indicating a quantity of times that the entry has been reported, wherein the entry in the LUT is associated with a timestamp indicating a time that the entry was last reported, and wherein the entry is kept in the LUT or deleted from the LUT based at least in part on the counter and the timestamp.

26. The apparatus of claim 15,
wherein the one or more processors are further configured to:
   transmit, to the UE, an L1 RSRP/SINR configuration message that configures the UE to download the LUT and transmit the L1 RSRP/SINR measurement report.

27. The apparatus of claim 15,
wherein the L1 RSRP/SINR measurement report includes one bit to indicate an L1 RSRP/SINR reporting format, and wherein the L1 RSRP/SINR reporting format indicates whether the L1 RSRP/SINR measurement report is a LUT-based report or a non-LUT-based report.

28. A method of wireless communication performed by a user equipment (UE), comprising:
   receiving, from a network node, a lookup table (LUT) and a reference signal associated with a beam management, wherein the LUT includes a plurality of entries corresponding to layer 1 (L1) reference signal received power (RSRP) or L1 signal-to-interference-plus-noise ratio (SINR) (RSRP/SINR) measurements;
   performing a L1 RSRP/SINR measurement based at least in part on the reference signal;

determining, based at least in part on a search of the LUT, an entry in the LUT that corresponds to the L1 RSRP/SINR measurement; and transmitting, to the network node, an L1 RSRP/SINR measurement report that indicates the entry in the LUT.

29. A method of wireless communication performed by a network node, comprising:

transmitting, to a user equipment (UE), a lookup table (LUT) and a reference signal associated with a beam management, wherein the LUT includes a plurality of entries corresponding to layer 1 (L1) reference signal received power (RSRP) or L1 signal-to-interference-plus-noise ratio (SINR) (RSRP/SINR) measurements; and receiving, from the UE, a L1 RSRP/SINR measurement report based at least in part on the reference signal, wherein the L1 RSRP/SINR measurement report indicates an entry in the LUT that corresponds to an L1 RSRP/SINR measurement.

30. The apparatus of claim 1, wherein the LUT is locally stored at the UE and is locally stored at the network node.

\* \* \* \* \*